No. 674,607. Patented May 21, 1901.
O. C. GEINES.
SULKY CULTIVATOR.
(Application filed Mar. 29, 1901.)
(No Model.) 2 Sheets—Sheet 1.
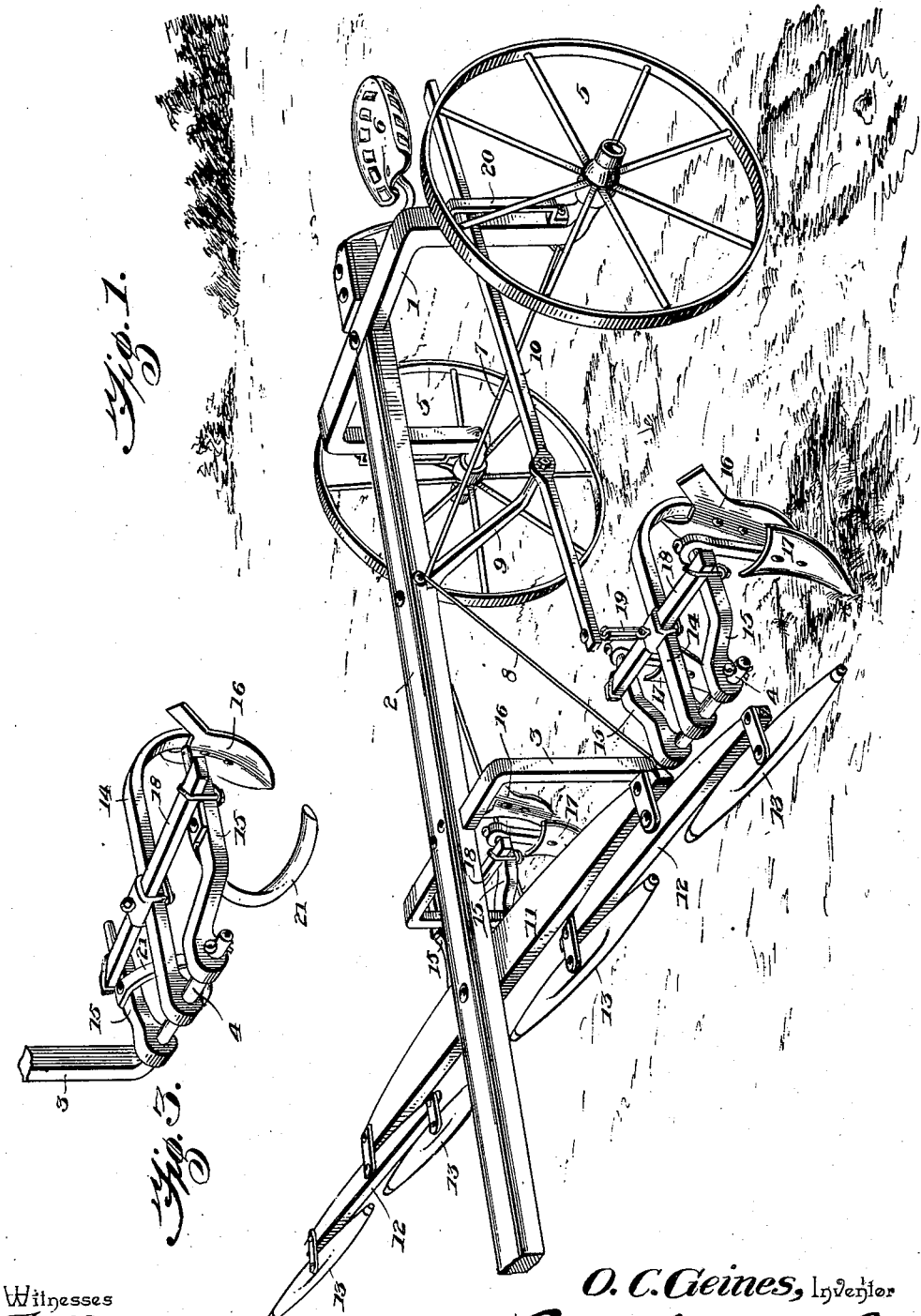
Witnesses
O. C. Geines, Inventor
Attorneys

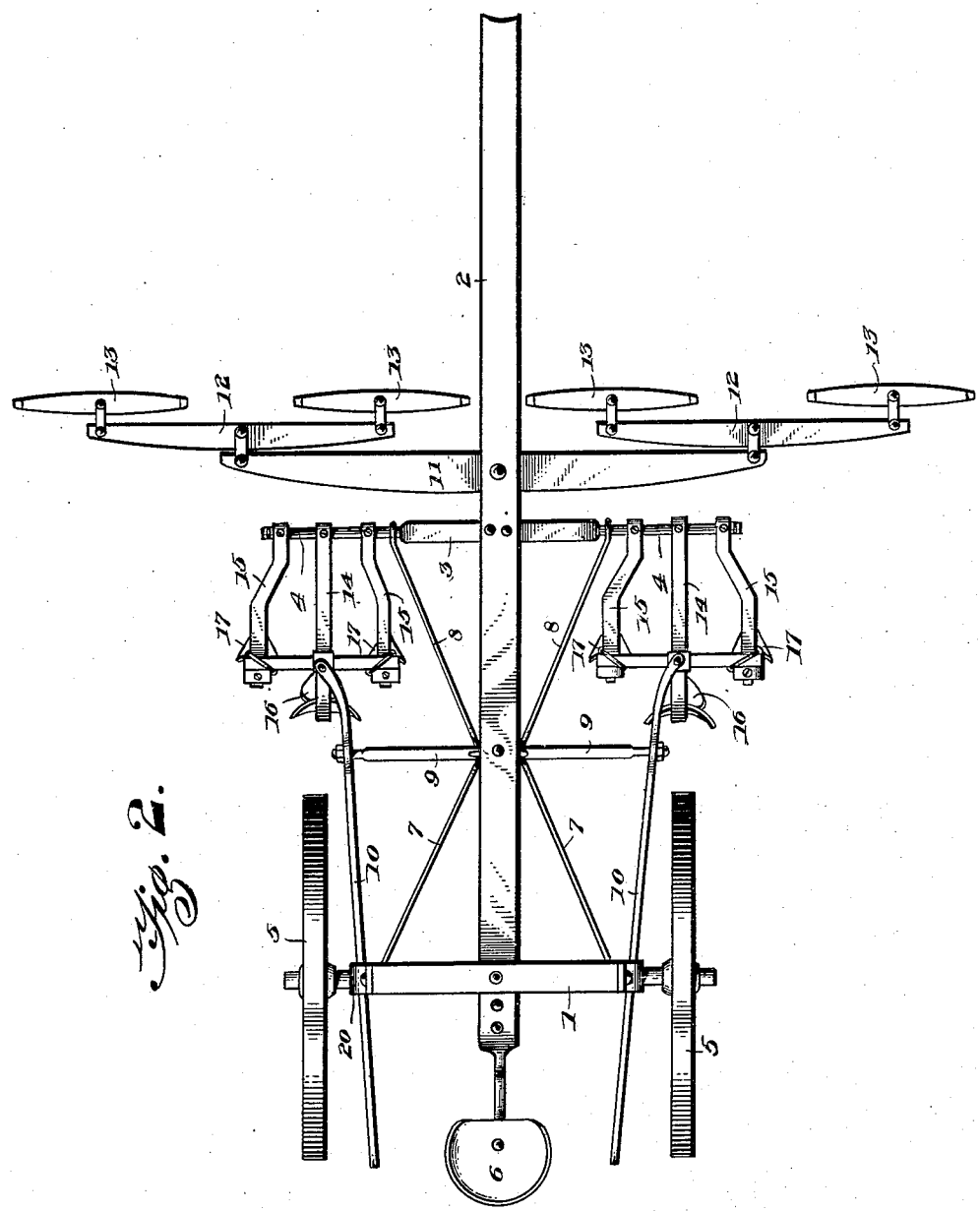

UNITED STATES PATENT OFFICE.

OLIVER C. GEINES, OF CURTIS, NEBRASKA.

SULKY-CULTIVATOR.

SPECIFICATION forming part of Letters Patent No. 674,607, dated May 21, 1901.

Application filed March 29, 1901. Serial No. 53,500. (No model.)

*To all whom it may concern:*

Be it known that I, OLIVER C. GEINES, a citizen of the United States, residing at Curtis, in the county of Frontier and State of Nebraska, have invented a new and useful Sulky-Cultivator, of which the following is a specification.

My invention is an improved sulky-cultivator adapted to cultivate four rows at a single round; and it consists in the peculiar construction and combination of devices hereinafter fully set forth and claimed.

In the accompanying drawings Figure 1 is a perspective view of a sulky-cultivator embodying my improvements. Fig. 2 is a top plan view of the same. Fig. 3 is a detail perspective view of the same.

To the arched axle 1 is attached the rear end of the tongue 2. To the under side of the latter, at a suitable distance in advance of the arched axle, is secured an arched bar 3, having horizontally-disposed outwardly-extending spindles 4. The arched axle is provided with the usual supporting-wheels 5, and in the form of my invention here shown the seat 6 for the driver is attached to the rear end of the tongue. Brace-rods 7 connect the arched axle to the tongue, and similar brace-rods 8 connect the arched bar 3 to the tongue. A cross-bar 9 has its central portion attached to the tongue at a point about midway between the arched axle and the arched bar. On the ends of said cross-bar 9 are fulcrumed levers 10, by means of which the gangs of cultivating-plows may be raised and lowered.

A draft-bar 11 is attached to the tongue at a suitable distance in advance of arched bar 3, as shown. To the ends of the draft-bar are attached the doubletrees 12, and each of the doubletrees has singletrees 13 at its ends. Hence a pair of draft-animals is attached to the cultivator and disposed on each side of the tongue.

On each of the spindles 4 of arched bar 3 are pivotally attached the front ends of three cultivator-beams 14 15, the cultivator-beams 14 being the center beams and adapted to carry cultivating-shovels 16 of large size, which operate in the centers between the rows and where the cultivator is employed for plowing listed corn adapted for breaking down the ridges between the rows and moving the earth toward the plants. Each of the beams 15 carries usually a cultivator plow or shovel 17 of smaller dimensions. The beams 14 15 are connected together by crossbars 18, so that each gang of beams may be raised and lowered in unison, and the central beams 14 are connected to the front ends of the levers 10 by suitable links 19 or other suitable devices. Hence the driver by means of the levers 10 may raise and lower the gangs of cultivating-plows at will. The rear portions of the levers 10 in the form of my invention here shown operate in guides 20, with which the arched axle is provided; but the said guides may be dispensed with.

The cultivator-shovels 17 may be detached from the beams 15 and suitable knives 21 employed in lieu thereof, as shown in Fig. 3, for destroying weeds between the rows.

Having thus described my invention, I claim—

1. A cultivator of the class described comprising an arched axle on which the supporting-wheels are mounted, a tongue attached to the axle, a transversely-disposed arched bar attached to the tongue, gangs of cultivator-plows attached to said arched bar, a cross-bar attached to the tongue and levers fulcrumed on said cross-bar and connected to said gangs of cultivator-plows for raising and lowering them, substantially as described.

2. A cultivator of the class described comprising an arched axle, on which the supporting-wheels are mounted, a tongue attached to the axle, a transversely-disposed arched bar attached to the tongue and provided with outwardly - extending horizontal spindles, gangs of cultivator-plows having their beams pivoted on said spindles and levers connected to and adapted for raising and lowering said gangs of cultivating-plows, substantially as described.

In testimony that I claim the foregoing as my own I have hereto affixed my signature in the presence of two witnesses.

OLIVER C. GEINES.

Witnesses:
FRANK F. RIDDELL,
JOHN BROOKS.